United States Patent [19]

Pai

[11] Patent Number: 5,158,342
[45] Date of Patent: Oct. 27, 1992

[54] TOOTHBRUSH AND ITS MANUFACTURING METHOD

[76] Inventor: Tien-Fa Pai, No. 7, Alley 28, Lane 281, Hwa Cheng Road, Hsin Chuang, Taipei, Taiwan

[21] Appl. No.: 716,669

[22] Filed: Jun. 17, 1991

[51] Int. Cl.⁵ .............................................. A46D 3/00
[52] U.S. Cl. ...................................... 300/21; 264/243
[58] Field of Search .......................... 300/21; 264/243

[56] References Cited

U.S. PATENT DOCUMENTS

| | | | |
|---|---|---|---|
| 2,355,744 | 8/1944 | Myers | 264/243 |
| 2,783,490 | 3/1957 | Kutik | 300/21 |
| 3,004,291 | 10/1961 | Schad | 264/243 |

*Primary Examiner*—Mark Rosenbaum
*Assistant Examiner*—John M. Husar
*Attorney, Agent, or Firm*—Bucknam and Archer

[57] ABSTRACT

A method of forming an integral piece of toothbrush, comprising firstly forming a toothbrush handle from thermo-plastic material by the process of injection molding to have a head portion longitudinally extending from an elongated hand-hold portion at one end and a concave-convex seat on said head portion and then, inserting said head portion in a cavity inside a molding device, which has a replaceable bristle molding comprised of a plurality of bristle molding elements each of which having a plurality of curved, tapered, unitary projecting strips, to directly mold bristles from thermo-plastic material on said concave-convex seat and then, removing the molded toothbrush from said molding device after cooling.

1 Claim, 2 Drawing Sheets

TOOTHBRUSH AND ITS MANUFACTURING METHOD

BACKGROUND OF THE INVENTION

The present invention relates to toothbrushes and relates more particularly to a toothbrush in which the bristles are directly integrally molded on the handle. The present invention further extends to a method for producing such a toothbrush.

Various types of toothbrushes have been disclosed for use in cleaning the teeth and stimulating the gums. According to the known structures, a toothbrush is generally comprised of two parts, namely, the handle and the bristles, wherein the bristles are vertically fastened in the handle at one end. Because the bristles are separately fastened in the handle at one end, standard quality may be difficult to maintain and, manufacturing process is complicated. Further, the bristles may easily drop from the place due to temperature or weather change.

The present invention has been accomplished to eliminate the aforesaid problems. It is therefore the main object of the present invention to provide a toothbrush which is easy to manufacture and durable in use. According to the main aspect of the present invention, the bristles are made of plastic material and directly molded on the handle to be incorporated therewith into an integral piece of device.

DETAILED DESCRIPTION OF THE PREFERRED EMBODIMENT

Referring to the annexed drawings in detail, the present invention is generally comprised of a pre-molded toothbrush handle 1 onto which bristles are directly molded by means of a bristle molding device 2.

Figure 2:
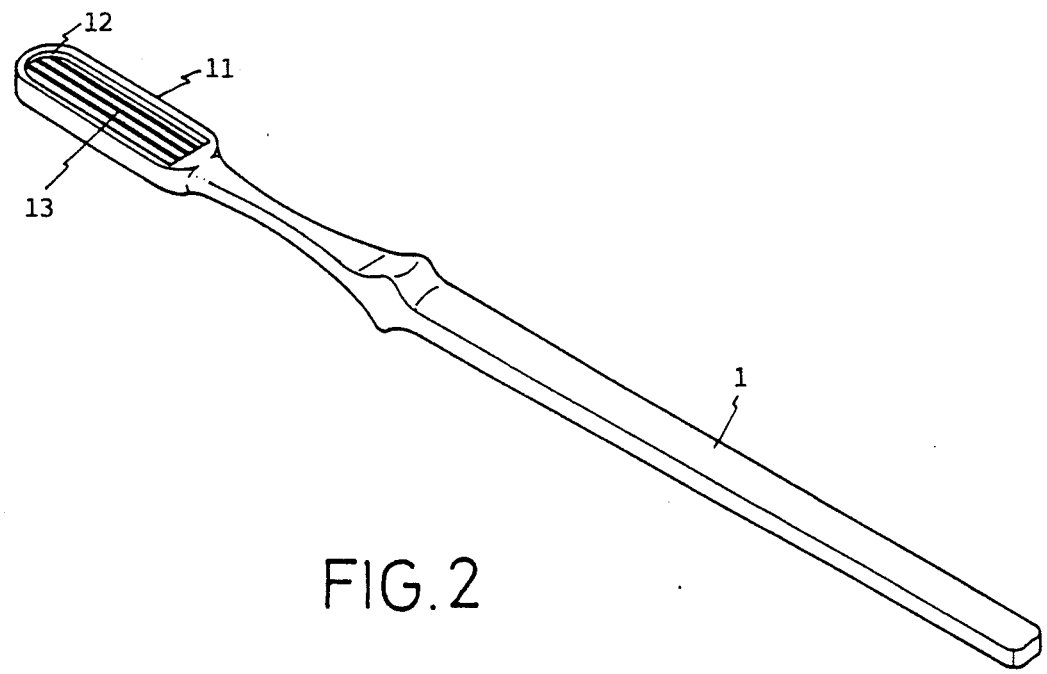
FIG. 2 is a perspective view of the handle (before the molding thereon of the bristles)

Referring to FIG. 2, a handle 1 in accordance with the present invention is made from high polymer material through injection molding process, having a head portion 11 longitudinally extending from an elongated hand-hold portion at one end and which is made of width relatively wider than said hand-hold portion and provided for molding bristles. The head portion 11 has a raised wide wall 12 around the periphery thereof defining therein a seat 13. The seat 13 has a concave-convex top surface for binding the bristles that are directly molded thereon. In the present preferred embodiment, the seat 13 has a plurality of parallel grooves and raised strips alternatively disposed on the top edge thereof.

Figure 1:
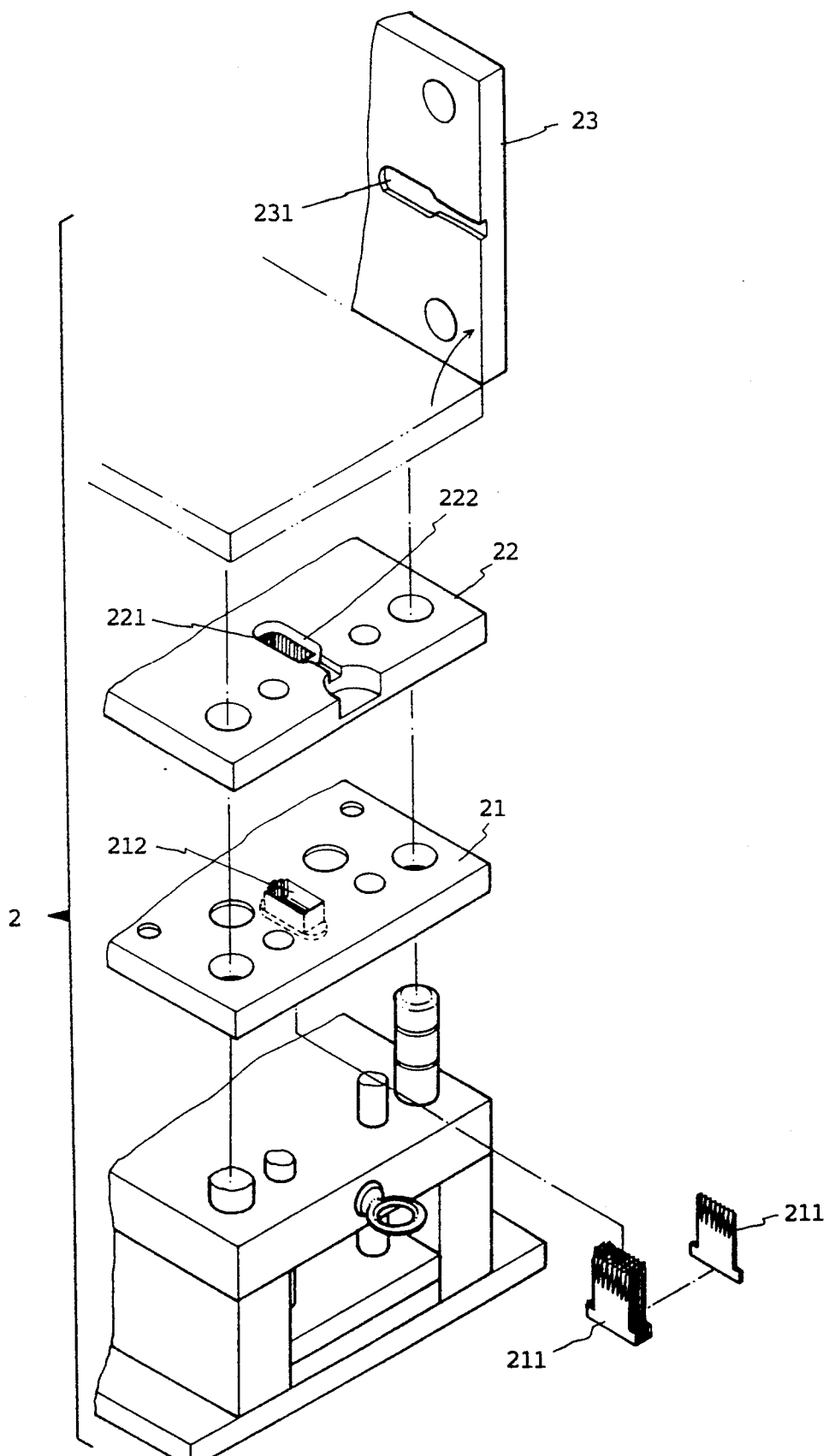
FIG. 1 is a perspective view of a bristle molding device according to the present invention.

Referring to FIG. 1, a bristle molding device 2 is generally comprised of a base mold 21, and intermediate mold 22 and a top mold 23. The base mold 21 has a material feed hole (not shown) connected to a bristle molding seat 212 at the center thereof and a bristle molding 211 removably fastened in said bristle molding seat 212, which bristle molding 211 is comprised of a plurality of bristle molding elements each of which comprised of plurality of curved, tapered, projecting strips which are vertically disposed at the top defining therein a plurality of tapered gaps in an inverted manner, i.e., each tapered gap has a narrower part at the top and a wider part at the bottom. The intermediate mold 22 is shaped like a flat plate having a cavity 221 in the middle corresponding to the curved, tapered, projecting strips 211 on the base mold 21 and a recessed portion 222 on the top edge thereof around said cavity 221 for holding the head portion 11 of the handle 1 in position. The cavity 221 has a curved inner wall surface matching with the periphery of the curved, tapered, projecting strips 211 and therefore, bristles can also be formed therebetween during molding process. In normal condition, the intermediate mold 22 is constantly mounted on the base mold 21 with the curved, tapered, projecting strips 211 disposed inside the cavity 221. The top mold 23 is releasably covered on the intermediate mold 22 and also shaped like a flat plate, having a slot 231 in the middle corresponding to the cavity 221 on the intermediate mold 22 for holding the head portion 11 of the handle 1.

Figure 3:
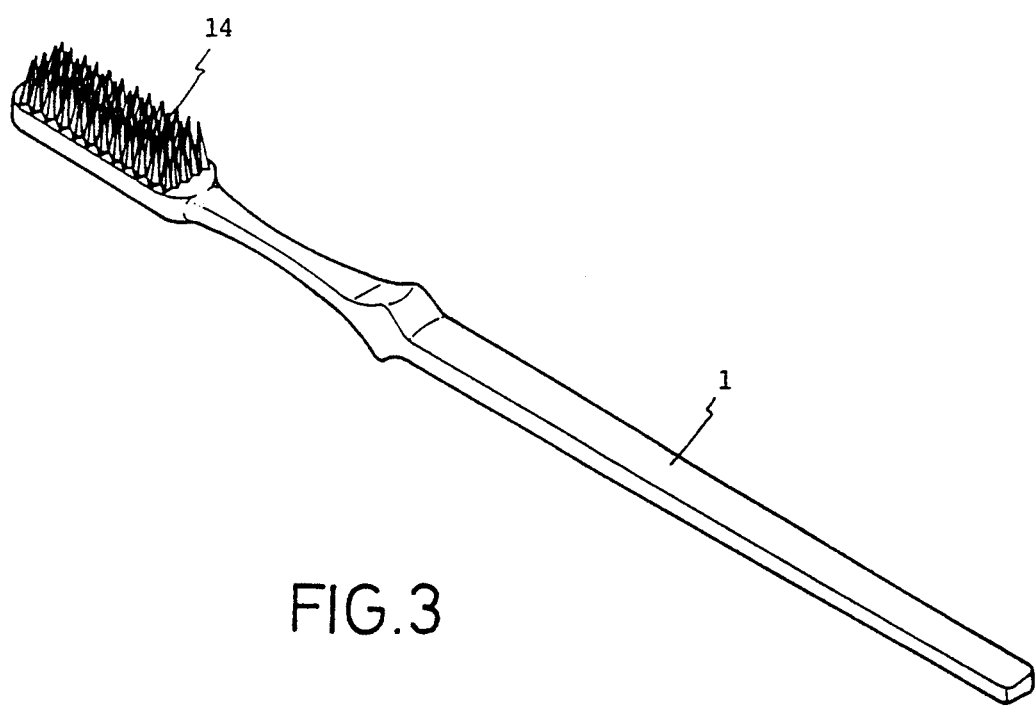
FIG. 3 is a perspective view of the handle (after the bristles having been molded thereon).

During bristle molding process, the head portion 11 of the handle 1 is inserted in the slot 231 on the top mold 23 and then, the top mold 23 is closed on the intermediate mold 22 permitting the seat 13 on the head portion 11 to be stopped against the curved, tapered, projecting strips 211 on the base mold 21. Then, pour molten plastic material into the gaps in the seat 13 and the curved, tapered, projecting strips 211. Because the seat 13 is made from high polymer material, it is immediately coupled with the molten plastic material that is fed into the cavity 221. After setting, the top mold 23 is opened and, bristles 14 are integrally formed on the head portion 11 of the handle 1, as shown in FIG. 3.

In order to obtain suitable softness, thermo plastic material, for example, silicone rubber is most preferably used for molding the bristles and, molding temperature is maintained at 100° C. to 200° C.; while molding pressure is maintained at 30 to 60 kgs/cm$^2$ and molding time is maintained at 5 to 10 seconds.

A multi-mold type of molding machine may be used to increase molding capacity and, automatic material feeding device may also be used for automatic production. Further, material can also be provided in assorted colors for choice. Further, each molding element of the bristle molding 211 can be removed for replacement, when it is damaged, and the whole assembly of the bristle molding device.

It is to be understood that the drawings are designed for purposes of illustration only, and are not intended as a definition of the limits and scope of the invention disclosed.

What is claimed is:

1. A method of forming a toothbrush comprising first forming a toothbrush handle (1) from thermoplastic material by injection molding, said handle having a head portion (11) and an elongated hand-hold portion, said head portion longitudinally extending from said elongated hand-hold portion at one end thereof, said head portion having a concave-convex seat (13) and then inserting said head portion in a molding device to mold bristles on said concave-convex seat (13), said molding device comprising:

a) a base mold (21) having a material feed hole, a bristle molding seat (212) connected to said material feed hole, and a bristle molding assembly (211) removably fastened in said bristle molding seat, said bristle molding assembly comprising a base and a plurality of molding elements, each of said molding elements comprising a curved, tapered projecting strip (211) vertically projecting from said base whereby a plurality of tapered gaps is formed therebetween, each gap being narrower at the top and wider at the bottom;

b) an intermediate mold (22) mounted on said base mold at the top thereof and having a cavity (221) into which said curved, tapered, projecting strips are inserted, and having a recessed portion (222) on the top edge thereof around said cavity for holding said head portion of said handle;

c) and a top mold (23) having a slot (231) corresponding to said cavity (221), the method comprising the steps of inserting said head portion (11) into said slot (231) in said top mold (23), closing said top mold on said intermediate mold whereby said seat (13) on said head portion is stopped against said projecting strips (211) on said base mold (21), pouring molten plastic material into said gaps, allowing said plastic material to set, cooling and opening said top mold whereby bristles are formed on said head portion, the method being carried out at a temperature of 100°-200° C., pressure of 30 to 60 kgs/cm$^2$ for 5 to 10 seconds, wherein said convex seat (13) in said head portion has a plurality of parallel grooves and raised projections therebetween and wherein the plastic material is silicone rubber.

* * * * *